(12) United States Patent
Chambers

(10) Patent No.: US 6,271,954 B1
(45) Date of Patent: Aug. 7, 2001

(54) WAVEGUIDE ABSORPTION MODULATOR WITH INTEGRAL OPTICAL ISOLATOR

(75) Inventor: Frank A. Chambers, Warrenville, IL (US)

(73) Assignee: Molex Fiber Optics, Inc., Downer's Grove, IL (US)

(*) Notice: Subject to any disclaimer, the term of this patent is extended or adjusted under 35 U.S.C. 154(b) by 0 days.

(21) Appl. No.: 08/210,150

(22) Filed: Mar. 17, 1994

(51) Int. Cl.⁷ .................................................. G02B 6/10
(52) U.S. Cl. ........................ 359/248; 359/245; 359/276; 359/284
(58) Field of Search .................................. 359/245, 276, 359/282, 284

(56) References Cited

U.S. PATENT DOCUMENTS

| | | | |
|---|---|---|---|
| 4,518,934 | * 5/1985 | Venkatesan | 359/245 |
| 4,826,295 | * 5/1989 | Burt | 359/276 |
| 5,245,465 | * 9/1993 | Tomita et al. | 359/282 |
| 5,402,259 | * 3/1995 | Lembo et al. | 359/284 |

\* cited by examiner

Primary Examiner—Vu A. Le
(74) Attorney, Agent, or Firm—Rogers & Killeen

(57) ABSTRACT

Methods and apparatus for isolating a modulation region of an external modulator that has a semiconductor waveguide structure that comprises at least one integral isolation region.

3 Claims, 2 Drawing Sheets

WAVEGUIDE ABSORPTION MODULATOR WITH INTEGRAL OPTICAL ISOLATOR

FIELD OF THE INVENTION

The invention relates to optical waveguides that include electro-absorption, and more particularly to such waveguides that modulate the intensity of optical beams with high speed electrical data signals.

BACKGROUND OF THE INVENTION

Optical signal transmission of data can have advantages over electrical transmission of data, particularly when data must be transmitted at very high rates. These advantages are usually associated with the wide bandwidth required in the transmission system, wherein transmission lines used for electrical data transmission are more subject to noise and signal attenuation than the optical fibers used for optical data transmission.

Light sources for such optical data systems can be directly or indirectly modulated by electrical signals that represent the transmitted data. Indirect modulation involves the use of an optical modulator that responds to the electrical signals that represent the data to be transmitted. Such optical modulators are typically of the electro-absorptive, electro-dispersive, or phase-shift type. Regardless of type, the optical modulator is usually configured to cause a variation or shift in the intensity of the optical beam from the light source in some relationship to the electrical signals.

Compact optical data transmitters of the indirectly modulated type preferably comprise a laser diode light source that is coupled to an electro-absorptive waveguide type modulator. Typically, the electro-absorptive modulator operates by utilizing the shift in transmissivity of the modulator's waveguide to a longer wavelength due to the application of a strong electric field.

This shift occurs with modulator waveguides of several different semiconductor structures, such as when the structure of the waveguide comprises a bulk semiconductor, a single isolated quantum well, multiple isolated quantum wells, or multiple coupled quantum wells (a superlattice). With this type of modulator, the wavelength at which the modulator's waveguide changes from relatively transmissive to relatively opaque changes as a function of the potential of the electrical input signals applied to it.

Thus, for any given instantaneous potential applied to the electrical input of the modulator, there is a range of wavelengths of light that may be passed through the modulator's waveguide with relatively low absorption, a range of wavelengths with relatively high absorption, and a narrow range of wavelengths at which the characteristics of the waveguide shift from relatively transmissive to relatively absorptive, an "electro-absorptive edge" region.

If an operating wavelength for the light source is selected so that the change in potential of the electrical input signals, plus any applied bias potential, shifts or varies the electro-absorptive edge about this operating wavelength, a modulated optical signal that has a relatively large depth of modulation is generated by the modulator. The modulator is biased to shift the wavelengths of the electro-absorptive edge with respect to the operating wavelength so that a relatively small change in input signal causes a relatively large change in absorption of the modulator.

Absorption modulators that have a semiconductor waveguide structure of the superlattice type exhibit very high contrast because of the high absorption to transmission ratio of light that is transmitted through this type of modulator using a small shift in modulator input signal potential. For instance, better than 30 db of contrast is achievable with as little as 3 volts shift in modulator input signal potential.

The optimal operating point in terms of contrast change as a function of modulation signal potential shift is in a region of relatively high absorption. To minimize insertion loss, a short modulation region is desirable, typically in the range of 100 to 200 microns in length. A short modulation region also improves the frequency response of the modulator.

One problem with such a modulator is that it has dimensions that make it difficult to handle and package. Another problem is that an external modulator of this type can induce optical feedback to a laser light source to which it is coupled. Variation in the feedback to a diode laser source during modulation can unstabilize the output of the diode laser and cause it to mode hop.

SUMMARY OF THE INVENTION

The invention comprises an absorption type modulator that has a semiconductor waveguide structure, at least an input isolation region coupled to the input of the modulator that has an index of absorption that changes with an applied bias potential and a short modulation region that is coupled to the output of the isolation region. The modulator may also have a second isolation region coupled to the output of the modulation region that has an index of absorption that changes with an applied bias potential.

The isolation region that is coupled to the input of the modulator serves to minimize optical feedback between the modulation region and a laser light source that is coupled to the input of the modulator. Since the isolation region can have a relatively long length, it also allows the overall dimensions of the modulator to be of reasonable size for easy handling and packaging while allowing the modulator region to be of small dimensions. An additional isolation region that couples the modulation region to the output of the modulator helps to minimize feedback of the modulated signal back into the modulator from downstream reflections.

DESCRIPTION OF THE PREFERRED EMBODIMENTS

Figure 1:
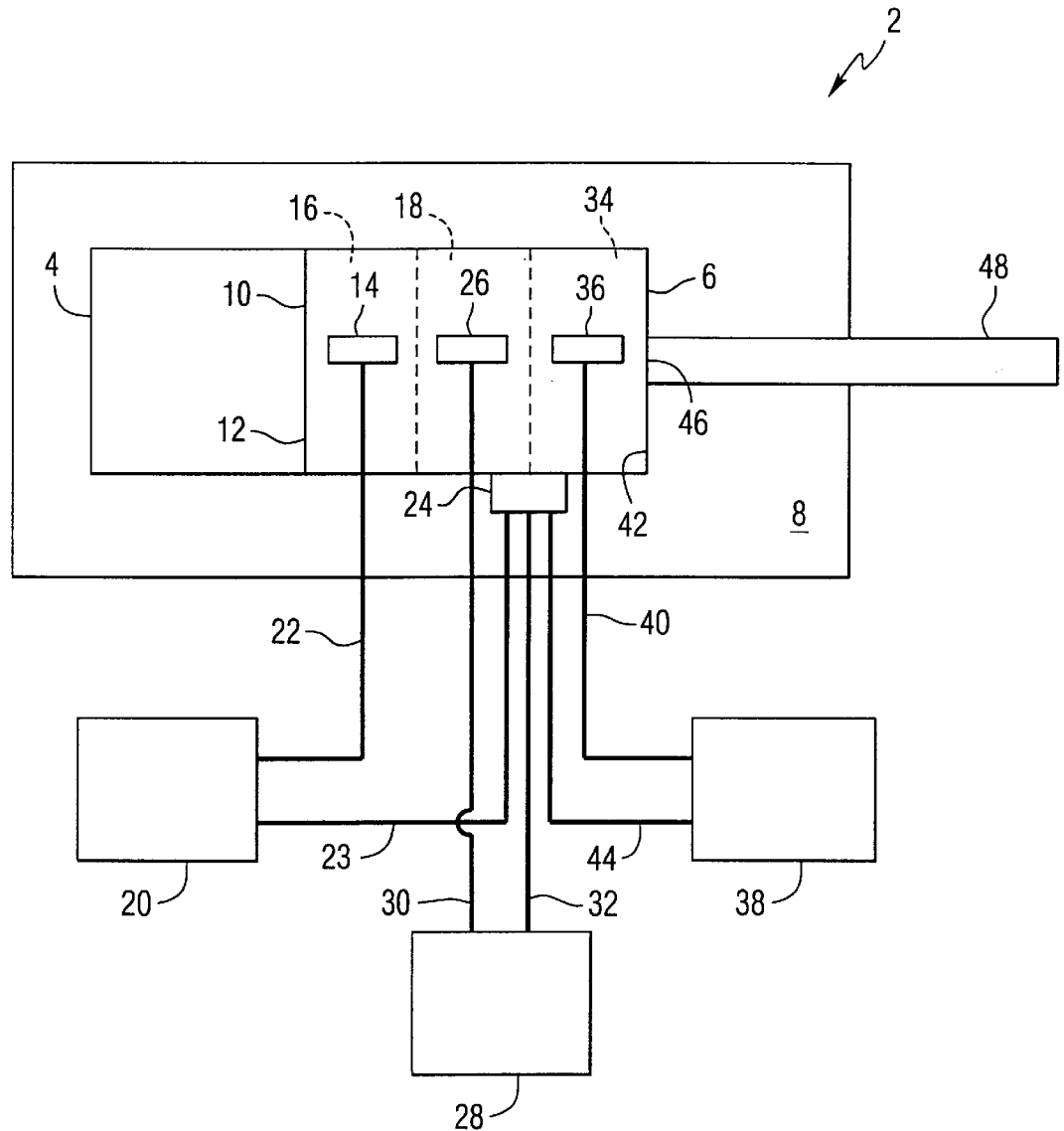
FIG. 1 shows a typical indirectly modulated optical data transmitter that is suitable for incorporating the invention.

FIG. 1 shows a typical indirectly modulated optical data transmitter 2 that is suitable for incorporating the invention. The transmitter 2 typically comprises a light source 4, an external electro-optical modulator 6, and a mounting substrate or sub-mount 8.

The light source 4 preferably comprises a laser diode that is butt-coupled to the modulator 6. Of course, the light source 4 may comprise a separate solid state laser or other source that is suitably coupled to the modulator 6, such as by lens coupling through free space or by an optical fiber.

The modulator 6 is preferably of the waveguide type, and it has a modulator region with an electrical signal input that changes the absorption or refractive index of the modulator's waveguide in some relationship to the application of an electrical signal that represents data to the modulator's electrical signal input. The modulator 6 also has at least one, and preferably two, isolator regions that control the transmission of light between the modulator region and the modulator input, the modulator output, or both.

The light source 4 preferably has an output facet 10 that is butt-coupled to a corresponding input facet 12 of the modulator 6 to most effectively couple the light generated by the light source 4 into the modulator 6. The modulator 6 has at least one input terminal 14 that is coupled to a first isolation region 16 of the modulator 6.

The first isolation region 16 of the modulator 6 controls the transmission of light from the light source 4 to a modulation region 18 of the modulator 6 in proportion to a first electrical bias signal generated by a first bias source 20 that is coupled to the input terminal 14 via a signal line 22. The circuit return between the first bias source 20 and the modulator 6 is typically made via a return wire 23 that is coupled between the first bias source 20 and a return terminal 24 on the substrate 8. The return terminal 24 is coupled to the return circuit of the modulator 6 in this case.

The modulation region 18 has at least one input terminal 26 to allow the potential of an electrical data signal that is generated by a data source 28 and connected to the input terminal 24 via a signal wire 30 to modulate the intensity of the light that is coupled into it from the light source 4. The circuit return between the data source 28 and the modulator 6 is typically made via a return wire 32 that is coupled between the data source 28 and the return terminal 24 on the substrate 8.

The modulator 6 may optionally have a second isolation region 34 that has at least one input terminal 36 that is connected to a second bias source 38 via a signal line 40. The second isolation region 34 controls the transmission of modulated light from the modulation region 18 to an output facet 42 of the modulator 6 in proportion to the potential of a second electrical bias signal that is generated by the second bias source 38 and applied to the input terminal 36 via the signal wire 40. The circuit return between the second bias source 38 and the modulator 6 is typically made via a return wire 44 that is coupled between the second bias source 38 and the return terminal 24 on the substrate 8.

The output facet 42 that is butt-coupled to an end facet 46 of an optical transmission fiber 48 to effectively couple modulated light into the optical fiber. The output of the modulator 6 may also be coupled to the optical fiber 48 by other means, such as by lens coupling through free space.

Figure 2:
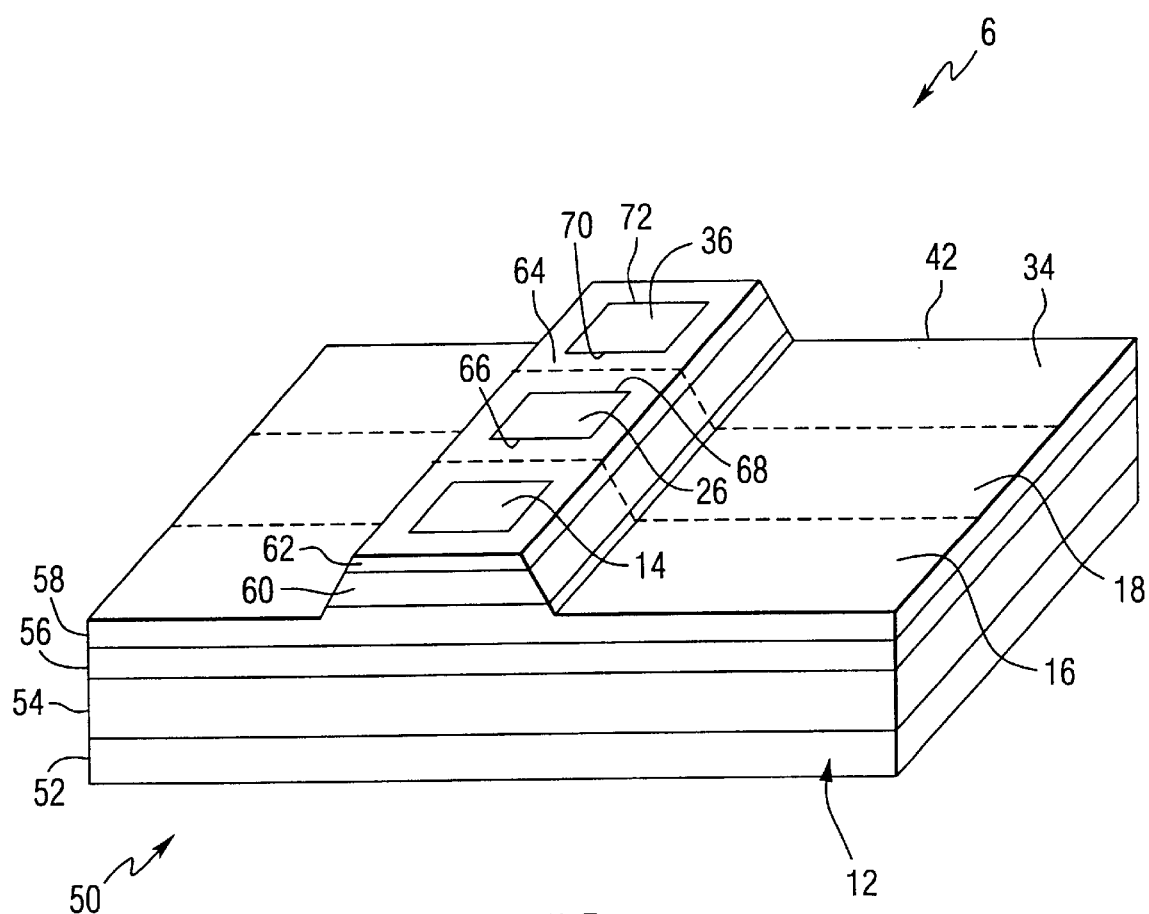
FIG. 2 shows an external optical modulator of the electro-absorption type that is configured according to the invention.

FIG. 2 shows the modulator 6 as described in connection with FIG. 1, wherein it is constructed according to a preferred embodiment of the invention. The modulator 6 preferably utilizes electro-absorption for modulation of the light received from the light source 4, although the modulator 6 may use any other known modulation technique.

Although the modulator 6 is described, for convenience, as specifically a GaAs/Al$_x$Ga$_{1-x}$As type of absorption device, it will be apparent to those skilled in the art that the structure may comprise alternate semiconductor compositions, depending on the operating wavelength of the light provided by the light source 4, as recognized by those skilled in the art.

The modulator 6 is shown with the input facet 12 visible. The modulator 6 is fabricated on a modulator substrate 50. The substrate 50 conveniently comprises conductive GaAs. A GaAs buffer layer 52 is grown to a thickness of approximately 0.25 micrometer on one planar surface of the substrate 50, although a thickness anywhere in the range of approximately 0 to 2 micrometers is acceptable. The layer 52 is doped with donor ions, typically Si, to a concentration of approximately n=1*10$^{18}$ per cubic centimeter, although a concentration anywhere in the range of n=1*10$^{17}$ to 4*10$^{18}$ per cubic centimeter, or a graded layer, is also acceptable.

Next, a lower cladding layer 54 of Al$_x$Ga$_{1-x}$As of composition X$_{clad}$ and thickness h$_{1c}$, wherein X$_{clad}$ and h$_{1c}$ are described below. The lower cladding layer 54 is also doped with donor ions, such as Si, to a concentration of approximately n=1*10$^{18}$ per cubic centimeter, although a concentration of approximately n=1*10$^{17}$ to 4*10$^{18}$ per cubic centimeter, or a graded layer, is also acceptable. Over the lower cladding layer 54 is then grown a waveguide core layer 56 that may have a single or multiple isolated quantum well Al$_x$Ga$_{1-x}$As/GaAs structure, a multiple coupled quantum well Al$_x$Ga$_{1-x}$As/GaAs structure, or a bulk Al$_x$Ga$_{1-x}$As structure of composition x$_{core}$ and thickness h$_{core}$, wherein x$_{core}$ and h$_{core}$ are described below. The waveguide core layer 56 is left substantially undoped. A superlattice structure is generally preferred due to lower static insertion loss.

Over the waveguide core layer 56 is grown an inner upper cladding layer 58, followed by an outer upper cladding layer 60. The layers 58 and 60 are both Al$_x$Ga$_{1-x}$As of composition x$_{clad}$. The layer 58 has a thickness h$_{uc1}$ and the layer 60 has a thickness of h$_{uc2}$, wherein h$_{uc1}$ and h$_{uc2}$ are described below. Typically, the layer 58 is not intentionally doped so that it forms an intrinsic region within the core of the modulator 6. A thin cap layer 62 of approximately 0.1 micrometer thickness is grown over the layer 60.

The layers 60 and 62 are doped with acceptor ions, such as Be, C, Mg or Zn. Typically it is Be-doped to a concentration of approximately p=1*10$^{18}$ per cubic centimeter for layer 60 and p=8*10$^{18}$ per cubic centimeter for layer 62, although a concentration in the range of approximately p=1*10$^{17}$ to 2*10$^{19}$ per cubic centimeter is also acceptable. Layers 58, 60 and 62 are etched to form at least one rib 64. To provide electrical isolation the rib 64 depth must be etched to below the dopant boundary between layers 58 and 60. Of course, instead of etching, a suitable index step can be provided by selective oxidation or impurity induced layer disordering (IILD), as well known in the art.

The thicknesses (h$_{1c}$, h$_{core}$, h$_{uc1}$, h$_{uc2}$) and compositions (x$_{clad}$, x$_{core}$) of the layers 52 through 60 described above are typically chosen so that light is guided in the core region of the modulator 6, as constrained along the core layer 56. Lateral confinement of the light within the core layer 56 is provided by the rib 64. Additionally, an absorption layer (not shown) is selected so that its electro-absorption edge straddles the chosen operating wavelength to provide a useful absorption to input signal amplitude transfer curve. This absorptive layer may be located within the core layer or within the cladding layers. The core layer and/or cladding layer structures may comprise, for instance, a bulk semiconductor composition, a single isolated quantum well, multiple isolated quantum wells, or multiple coupled quantum wells (a superlattice).

The thicknesses of the layers 58 and 60, h$_{uc1}$ and h$_{uc2}$ respectively, are chosen to strike a balance between a large electric field and a single lateral optical mode when the rib 64 is etched into the layers 58, 60 and 62. For a given applied input signal potential to the modulator 6, the electric field increases as h$_{uc1}$ decreases, and thus it is advantageous to decrease h$_{uc1}$ to decrease the operating potential. To provide electrical isolation of the rib 62, etching must extend below the dopant boundary between layers 58 and 60. If the etch is too deep, multiple lateral modes will be allowed, and this may adversely affect performance.

The input terminal 14 for the first isolation region 16 of the modulator 6 extends in length from the vicinity of approximately the plane of the input facet 12 to the vicinity of a leading edge 66 of the input terminal 26 for the modulation region 18. The length of the input terminal 26 from the leading edge 66 to a trailing edge 68 of the input terminal 26 generally ranges from approximately 100 to 500 micrometers. If no second isolation region 34 is utilized, the trailing edge 68 of the input terminal 26 extends to the vicinity of approximately the plane of the output facet 42 of the modulator 6.

If the second isolation region 34 is utilized, the trailing edge 68 of the input terminal 26 extends to the vicinity of a leading edge 70 of the input terminal 36 for the second isolation region 34. A trailing edge of the input terminal 26 extends to the vicinity of approximately the plane of the output facet 42.

Returning to FIG. 1, the first isolation region 16 and the second isolation region 34 may be used as a high data rate optical signal detector, because for a given bias potential as provided by the first bias source 20 to the first isolation region 16 and the second bias source to the second isolation region 34, any change in intensity of light that passes through either of the isolation regions 16, 34 will cause a change in current that is supplied by the bias sources 20, 38. Thus, an optical signal that is modulated in intensity can be detected by either of the isolation regions 16, 34 as a corresponding change in bias current amplitude.

When the transmitter 2 is so used for receiving purposes, at least the first isolation region 16, and preferably the modulator region 18 as well, are biased to be highly absorptive when the second isolation region 34 is used for detection purposes. This allows the light source 4 to remain powered at all times. The level of the absorption by the first isolation region 16 and the modulator region 18 prevent the output of the light source 4 from reaching the second isolation region 34, so that the second isolation region 34 only responds to the amplitude of an optical signal received from the fiber 48.

For normal transmitting purposes, at least one of the isolation regions 16, 34 is biased to provide the desired degree of isolation for the modulator region 18. The switching between receiving and transmitting states does not require that the light source 4 be disabled, since the absorptively biased first isolation region 16 and the modulator region 18 block substantially all the light generated by the light source 4 from reaching the second isolation region.

Thus, there has been described herein a waveguide type electro-absorptive optical modulator that has a semiconductor waveguide structure, at least an input isolation region coupled to the input of the modulator that has an index of absorption that changes with an applied bias potential and a short modulation region that is coupled to the output of the isolation region. The modulator may also have a second isolation region coupled to the output of the modulation region that has an index of absorption that changes with an applied bias potential. The embodiments described above should not be construed as limiting the scope of the invention because they are only made as specific examples of the implementation of the invention as claimed. It should be understood that various changes in the details, parts, materials, processing and fabrication of the invention as described above may be made while remaining within the scope of the claimed invention.

What is claimed is:

1. A method of controlling the coupling of optical radiation into a multiple layer semiconductor optical modulator of the electro-absorption type that comprises at least a waveguide core layer, an input facet and an output facet for transmission of said optical radiation through said waveguide layer, and at least one cladding layer that is ribbed for lateral confinement of said optical radiation that passes through said waveguide core layer, and that comprises the steps of:

depositing a metallic modulation input signal layer over a selected portion of said at least one rib to define a modulation region along said at least one rib;

depositing at least one metallic bias input signal layer from the vicinity of the plane of at least one of said facets to the vicinity of said modulation input signal layer to define at least one isolation region along said at least one rib; and applying a bias potential to said at least one isolation region to control the coupling of optical radiation between said at least one facet to said modulation region.

2. A method of detecting the level of optical radiation that is coupled into a multiple layer semiconductor optical modulator of the electro-absorption type that comprises at least a waveguide core layer, an input facet and an output facet for transmission of said optical radiation through said waveguide layer, and at least one cladding layer that is ribbed for lateral confinement of said optical radiation that passes through said waveguide core layer, a modulation region that is defined by a metallic modulation input signal layer deposited over a selected portion of said at least one rib, and at least one isolation region that is defined by at least one metallic bias input signal layer deposited over said at least one rib from the vicinity of the plane of at least one of said facets to the vicinity of said modulation input signal layer, and that comprises the steps of:

applying a constant-potential bias source to said at least one metallic bias input signal layer; and monitoring the change in current supplied by said bias source to detect changes in the amplitude of optical radiation that is passed through said modulator.

3. A multiple layer semiconductor optical modulator of the electro-absorption type that controls the coupling of optical radiation through said modulator, that comprises at least a waveguide core layer, an input facet and an output facet for transmission of said optical radiation through said waveguide layer, and at least one cladding layer that is ribbed for lateral confinement of said optical radiation that passes through said waveguide core layer, and further comprises:

a metallic modulation input signal layer over a selected portion of said at least one rib to define a modulation region along said at least one rib; and at least one metallic bias input signal layer from the vicinity of the plane of at least one of said facets to the vicinity of said modulation input signal layer to define at least one isolation region along said at least one rib.

* * * * *